US012344231B2

(12) United States Patent
Friedrich et al.

(10) Patent No.: US 12,344,231 B2
(45) Date of Patent: Jul. 1, 2025

(54) CONTROL DEVICE AND METHOD FOR OPERATING A HYBRID DRIVE

(71) Applicant: Bayerische Motoren Werke Aktiengesellschaft, Munich (DE)

(72) Inventors: Michael Friedrich, Eching (DE); Markus Nussbaumer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 598 days.

(21) Appl. No.: 17/435,622

(22) PCT Filed: Apr. 7, 2020

(86) PCT No.: PCT/EP2020/059825
§ 371 (c)(1),
(2) Date: Sep. 1, 2021

(87) PCT Pub. No.: WO2020/224899
PCT Pub. Date: Nov. 12, 2020

(65) Prior Publication Data
US 2022/0194358 A1    Jun. 23, 2022

(30) Foreign Application Priority Data

May 3, 2019   (DE) .................... 10 2019 111 481.0

(51) Int. Cl.
*B60W 20/17*    (2016.01)
*B60K 6/48*    (2007.10)
(Continued)

(52) U.S. Cl.
CPC ............... *B60W 20/17* (2016.01); *B60K 6/48* (2013.01); *B60W 10/02* (2013.01); *B60W 10/06* (2013.01);
(Continued)

(58) Field of Classification Search
CPC ...... B60W 20/17; B60W 10/02; B60W 10/06; B60W 10/08; B60W 30/20;
(Continued)

(56) References Cited

U.S. PATENT DOCUMENTS

2004/0144347 A1    7/2004  Schleusener et al.
2006/0169245 A1*   8/2006  Zillmer ................. F02D 41/126
                                                        123/299
(Continued)

FOREIGN PATENT DOCUMENTS

CN    108340919 A    7/2018
CN    108698499 A    10/2018
(Continued)

OTHER PUBLICATIONS

International Search Report (PCT/ISA/210) issued in PCT Application No. PCT/EP2020/059825 dated Jun. 24, 2020 with English translation (four (4) pages).
(Continued)

*Primary Examiner* — Yufeng Zhang
(74) *Attorney, Agent, or Firm* — Crowell & Moring LLP

(57) ABSTRACT

A hybrid drive includes an internal combustion engine, an electrical machine, at least one torsional vibration damper, and an electronic control unit. The torsional vibration damper is designed for optimal vibration damping during operation of the internal combustion engine with the full number of cylinders of the internal combustion engine switched-on in internal-combustion-engine mode. The electronic control unit is further designed such that, in purely electric-motor mode where no cylinders are switched on, the electrical machine simulates the cylinder-ignition-dependent torque excitations of the switched-off internal combustion engine substantially identically until the internal combustion engine is switched back on.

10 Claims, 3 Drawing Sheets

(51) Int. Cl.
  *B60W 10/02* (2006.01)
  *B60W 10/06* (2006.01)
  *B60W 10/08* (2006.01)
  *B60W 30/20* (2006.01)
  *F16F 15/00* (2006.01)

(52) U.S. Cl.
  CPC ............ *B60W 10/08* (2013.01); *B60W 30/20* (2013.01); *F16F 15/002* (2013.01); *B60K 2006/4825* (2013.01); *B60W 2030/206* (2013.01); *B60W 2510/0657* (2013.01); *B60W 2710/083* (2013.01); *B60Y 2400/48* (2013.01)

(58) Field of Classification Search
  CPC ... B60W 2030/206; B60W 2510/0657; B60W 2710/083; B60K 6/48; B60K 2006/4825; F16F 15/002; F16F 15/145; F16F 15/18; B60Y 2400/48; Y02T 10/62
  See application file for complete search history.

(56) References Cited

U.S. PATENT DOCUMENTS

| | | | | |
|---|---|---|---|---|
| 2006/0173590 | A1* | 8/2006 | Zillmer | B60W 10/08 |
| | | | | 701/22 |
| 2009/0152027 | A1* | 6/2009 | Kusaka | F02D 13/08 |
| | | | | 180/65.28 |
| 2015/0362042 | A1* | 12/2015 | Orlamunder | F16F 15/145 |
| | | | | 74/574.2 |
| 2018/0208181 | A1 | 7/2018 | Schneider et al. | |
| 2018/0335006 | A1* | 11/2018 | Grethel | H02P 9/08 |
| 2018/0362020 | A1 | 12/2018 | Kobler et al. | |

FOREIGN PATENT DOCUMENTS

| | | |
|---|---|---|
| DE | 195 32 128 A1 | 3/1997 |
| DE | 101 23 186 A1 | 11/2002 |
| DE | 10 2005 001 047 A1 | 7/2006 |
| DE | 10 2011 079 604 A1 | 1/2013 |
| DE | 20 2013 104 787 U1 | 1/2014 |
| DE | 10 2014 202 058 A1 | 8/2015 |
| EP | 2 911 928 B1 | 10/2017 |
| JP | 2002-276416 A | 9/2002 |

OTHER PUBLICATIONS

German-language Written Opinion (PCT/ISA/237) issued in PCT Application No. PCT/EP2020/059825 dated Jun. 24, 2020 (six (6) pages).

German-language Search Report issued in German Application No. 10 2019 111 481.0 dated Jan. 21, 2020 with an partial English translation (11 pages).

Chinese-language Office Action issued in Chinese Application No. 202080018501.6 dated Dec. 13, 2023 with English translation (18 pages).

* cited by examiner

CONTROL DEVICE AND METHOD FOR OPERATING A HYBRID DRIVE

BACKGROUND AND SUMMARY OF THE INVENTION

The present subject matter relates to a control device and a method for operating a hybrid drive for a motor vehicle with at least one electric drive motor (also called an electric machine or an electric motor for short) and a combustion engine (also called an internal combustion engine (ICE)), each of which may be used individually or jointly in order to provide a propulsion torque usually requested at a transmission output of the vehicle.

EP 2 911 928 B1 relates to a method of torsional vibration stabilization in a drive train which has a combustion engine, in particular a reciprocating engine, and at least one additional machine connected to it, in particular an electric machine, wherein during at least a first phase a torque impulse is introduced into the drive train by the combustion engine, and wherein at least one torque impulse is specifically generated for torsional vibration stabilization by the additional machine, wherein the torque impulse of the additional machine is applied phase-shifted relative to the torque impulse of the combustion engine in the drive train during at least a second phase following the first phase. EP 2 911 928 B1 is concerned with creating a comfort increasing solution for commercial combustion engines with three or fewer cylinders, which are disadvantageous from the vibration and torsional vibration technical viewpoint.

It is an object of the present subject matter to improve the comfort and the dynamics of the vehicle with an electronic control unit and a method for operating a hybrid drive while maintaining the reduction in consumption.

The present subject matter relates to a control device for a hybrid drive comprising a combustion engine, an electric machine, at least one torsional vibration stabilizer and an electronic control unit, wherein the torsional vibration stabilizer is designed for optimum vibration damping with the full number of cylinders of the combustion engine in combustion engine mode.

Furthermore, the electronic control unit is designed in such a way that in purely electric motor mode the electric machine at least almost identically simulates one or more of the cylinder-ignition-dependent torque excitations of the switched-off combustion engine by means of electric motor generated torque excitations until the reactivation of the combustion engine.

Alternatively or additionally, the electronic control unit is designed in such a way that the electric motor, when operating with only partially switched-off cylinders of the combustion engine, at least almost identically, and/or to a large extent, substantially replaces the missing cylinder-ignition-dependent torque excitations of the switched-off cylinders until all cylinders of the combustion engine are reactivated. A partial cylinder mode or a mode with partially switched-off cylinders means that some cylinders of the combustion engine are not fired and thus do not provide torque excitations.

A property of a torsional vibration damper (in particular a rotary mass oscillator) is that oscillating damping masses are functionally matched to the cylinder number-specific excitations of the combustion engine.

The present subject matter is based on the following two discovered findings, both of which are relevant either individually or in combination with each other.

First finding—Achieving the damping effect of a torsional vibration damper, preferably in the form of a revolution rate-sensitive mass oscillator, in a hybrid drive train in the electric driving mode:

According to the present subject matter, a torsional vibration damper (in particular a torsional mass oscillator) is provided in a hybrid drive train with a P1 or P2 topology (FIG. 1) as a measure for damping or stabilization of torsional vibrations of the combustion engine, the oscillating damping masses of which are functionally adapted to the cylinder number-specific excitation of the combustion engine.

In an electric driving mode, the excitation by the combustion engine is typically absent, wherein the rotary mass oscillator or the torsional vibration stabilizer loses its damping properties.

When the combustion engine is suddenly reactivated by starting it following purely electric driving, the oscillating rotary masses require a finite time to build up the damping effect. Thus, comfort impairments can occur when transitioning from purely electric driving to hybrid and/or combustion engine driving, especially in P1 architectures or in P2 architectures used in a simulated P1 mode, i.e. which realize electric driving with an engaged separating clutch.

According to the present subject matter, a torque profile similar to the excitation by the cylinders of the combustion engine is therefore superimposed on the torque of the electric machine during purely electric driving with the aim of keeping the downstream torsional vibration stabilizer or rotary mass oscillator functioning with regard to the damping effect thereof.

Second finding—The use of at least one particular torsional vibration damper system in the form of a torsional vibration stabilizer, preferably as a combination of a torsional vibration damper and a torsional vibration stabilizer, and maintenance of the damping of this torsional vibration stabilizer (in particular implemented as a revolution rate-sensitive mass oscillator or centrifugal pendulum) at different excitation frequencies based on engine orders of the combustion engine by means of corresponding torque excitations from the electric machine:

The finding is based on an analysis of the vibration behavior of a hybrid drive train with at least one revolution rate-sensitive torsional vibration stabilizer, preferably a mass oscillator, for selective cylinder deactivation.

According to the present subject matter at least one engine-order-specific torsional vibration stabilizer is integrated in the drive train, which ensures possibly complete damping of the revolution rate oscillations in the drive train, preferably for relatively low revolution rates. These are adapted to the excitation orders when operating with the full number of cylinders of the combustion engine. In the case of operation of the combustion engine with at least partial cylinder deactivation, these torsional vibration stabilizers lose a large part of their effect due to the different stimulating engine order.

To maintain the damping effect, furthermore according to the present subject matter in the case of at least partial cylinder deactivation by the electric machine, which is preferably integrated between the combustion engine and the torsional vibration stabilizer (in particular, in the form of a revolution rate-sensitive mass oscillator), the excitation frequency of the engine order is maintained in full cylinder mode for the revolution rate-sensitive mass oscillator (DSM). The electric machine represents a frequency-controlled source of torque which replaces the torque excitations of the deactivated cylinders of the combustion engine by targeted electric motor generated torque excitations. For this purpose, a torque excitation with similar amplitude and shape which is synchronous in time with the missing torque excitations of the deactivated cylinders is introduced by the electric machine.

Preferably, an additional torsional vibration damper is integrated between the combustion engine and the electric machine, for example in the form of a spring stage to pre-damp the torque excitations of the combustion engine, so that the torque excitations by the electric machine do not have to be carried out at the level of the torque excitations of the combustion engine.

The present subject matter is also based on the following further findings:

In the event of a restart of the combustion engine and the necessary traction force bridging by the electric machine until the traction force is taken over by the running combustion engine, considerable energy is expended undesirably and time passes.

In the case of hybrid drive topologies with a separating clutch between the combustion engine and the electric motor, the combustion engine may be decoupled by disengaging the separating clutch during purely electric driving. Purely electric driving with the combustion engine dragged or coupled has not yet been used due to the high drag torques.

In an advantageous further development, for given operating conditions, in the state of purely electric driving and/or recuperation, the present subject matter provides that the combustion engine is not decoupled, if possible, but the drag torque of the combustion engine is reduced as well as possible.

In this case, according to the present subject matter, it is proposed to activate gas exchange valve control devices for cylinder inlet and cylinder exhaust valves, which are actually intended for filling control with a running combustion engine, in the sense of at least an almost complete, preferably complete, permanent closure of the inlet and exhaust valves during the non-running mode of the combustion engine. Preferably, the non-running, dragged mode of the combustion engine with such closed inlet and exhaust valves is preferably activated either during purely electric driving (positive drive torque) under certain conditions or during recuperation (negative drive torque) under certain conditions.

With the development according to the present subject matter, during the non-running mode of the combustion engine both in hybrid architectures which have a fixed coupling of the electric machine to the combustion engine and in hybrid architectures which have a separating clutch between the combustion engine and the electric machine, the drag torque on the combustion engine is thus significantly reduced by closing the inlet and outlet valves.

A particularly advantageous implementation for the closure of the valves during dragging both during purely electric driving and during recuperation is fully variable valve lift control on the inlet side and a simple shutdown of the valve train by means of a switching actuator system on the exhaust side. For an explanation of the basic structure of a possible valve control device for fully variable valve lift control, reference is made to DE 101 23 186 A1, for example.

It should be noted that additional features of a dependent claim depends from an independent claim without the features of the independent claim, or only in combination with a subset of the features of the independent claim, can form a separate invention which is independent of the combination of all the features of the independent claim, and which may be made the subject-matter of an independent claim, a divisional application or a subsequent application. This applies in the same way to technical teachings described in the description which may constitute an invention which is independent of the features of the independent claims.

According to another aspect, a software (SW) program is used in an electronic control unit. The SW program can be set up to be implemented on a processor of the electronic control unit, such as an electronic control unit of a vehicle, and thereby implement the method described in accordance with the present subject matter.

According to another aspect a non-transitory computer-readable memory medium is described. The memory medium may contain a SW program which is set up to be implemented on a processor, and thereby to implement the method described in accordance with the present subject matter.

It should be noted that the methods, devices and systems described in this document can be used both alone and in combination with other methods, devices and systems described in this document. Furthermore, all aspects of the methods, devices and systems described in this document can be combined in a variety of ways. In particular, the features of the claims can be combined in a variety of ways.

DETAILED DESCRIPTION OF THE DRAWINGS

Figure 1:
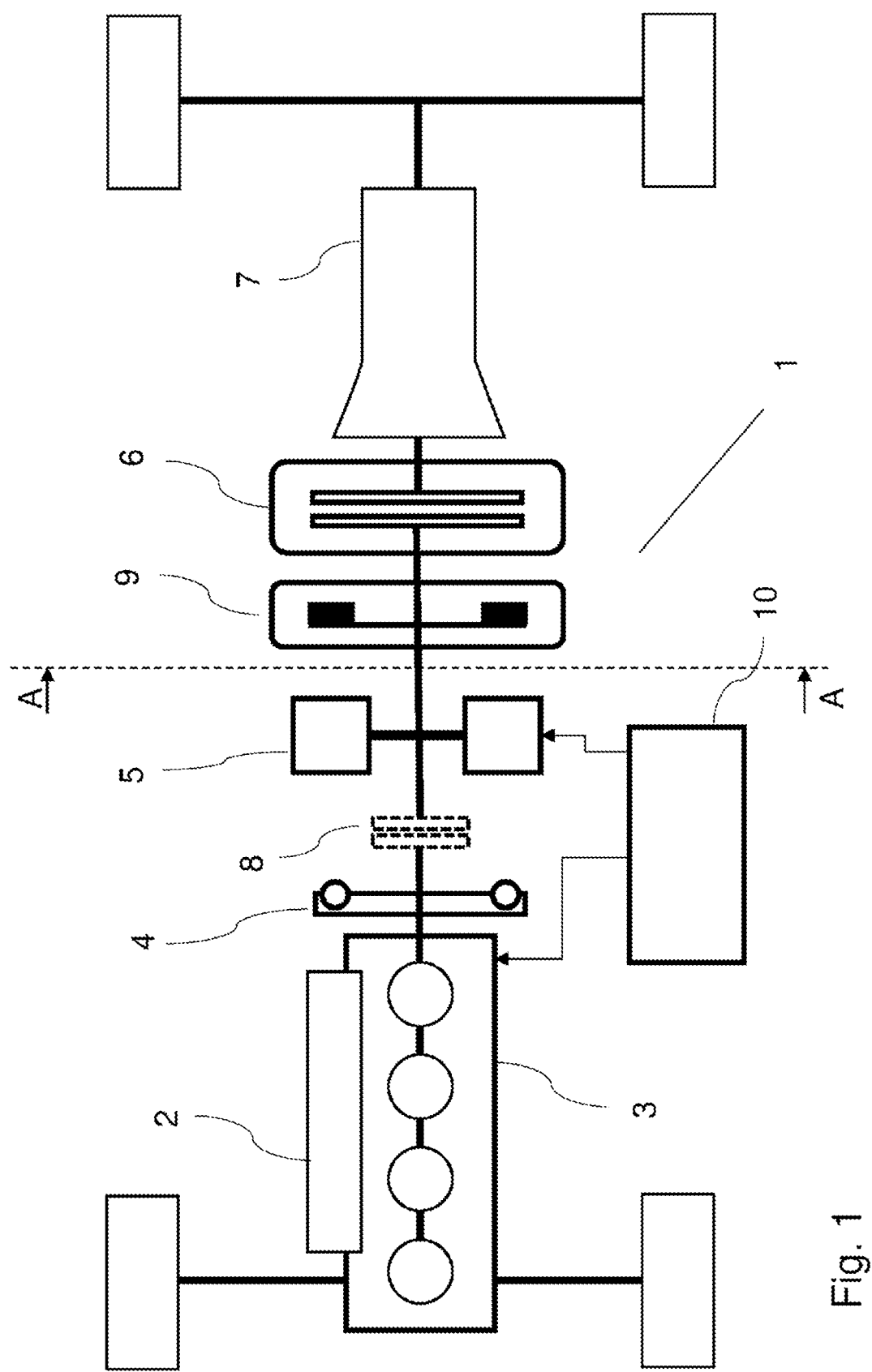
FIG. 1 shows schematically a vehicle with a hybrid drivetrain, which can be optionally configured as a P1 or P2 architecture, and with an electronic control unit for the activation according to the present subject matter of the electric machine as an electric drive motor.

FIG. 1 includes a combustion engine 3 and an electric machine 5, such as an electric motor, which can be used individually or together to generate a drive torque for a vehicle 1. The combustion engine 3 and the electric machine 5 are arranged in such a way that the torques generated by the respective drive motors add to form a total drive torque, which for example is transmitted via a transmission 7 and an output shaft of the transmission 7, usually to at least two drive wheels of the vehicle 1. The electrical energy for the operation of the electric machine 5 is supplied in an electrical energy storage device (e.g., a 48V battery or a high-voltage battery, not illustrated in detail here).

Vehicle 1 also includes an electronic control unit 10, such as engine control unit, which is set up to determine a requested total drive torque. The requested total drive torque can be specified by the driver of vehicle 1, for example by means of an accelerator pedal. For example, a driver can operate the accelerator pedal to request an increased total drive torque. The electronic control unit 10 can be set up to divide the requested total drive torque into a first torque for the combustion engine 3 and a second torque for the electric machine 5. In other words, the electronic control unit 10 may be set up to operate the combustion engine 3 and the electric machine 5 depending on a requested total drive torque.

Furthermore, FIG. 1 shows an optional separating clutch 8, by means of which the combustion engine 3 and the electric machine 5 can be decoupled. With this separating clutch 8, there is a so-called P2 hybrid topology. Without the separating clutch 8, there is a so-called P1 hybrid topology.

A torsional vibration damper 4 in the form of a spring stabilizer is preferably arranged between the combustion engine 3 and the electric machine 5. A torsional vibration stabilizer 9, for example in the form of a centrifugal pendulum, is arranged downstream of the electric machine 5.

The combustion engine 3 preferably has a first valve control device for closing the inlet valves and a second valve control device for closing the exhaust valves, which, in combination with a function module for reducing drag torque in the electronic control unit 10, allows effective drag reduction by closing the inlet and exhaust valves. Finally, a starting element 6 in the form of a clutch or torque converter with a lock-up clutch is provided, preferably before or in the transmission 7. The devices for reducing drag torque are indicated in FIG. 1 by the reference character 2.

The combustion engine 3 of a hybrid drive can be at least temporarily deactivated partly or completely, for example, in the case of purely electric operation of the hybrid drive, and/or in the case of recuperation in so-called thrust mode when the wheels of the vehicle drive the output shaft. The drive shaft of the deactivated combustion engine 3 can thus be operated in a non-running dragged mode by the electric machine 5 with the separating clutch 8 engaged and/or driven and/or rotated by the wheels of the vehicle 1. A non-running dragged mode of the combustion engine 3 has the advantage that the combustion engine 3 can be fired again rapidly and efficiently to contribute drive torque to the overall drive of the vehicle 1.

The torsional vibration stabilizer 9 is designed according to the present subject matter for optimal vibration damping with the full number of cylinders (e.g., four) of the combustion engine 3 in combustion engine mode.

Figure 2:
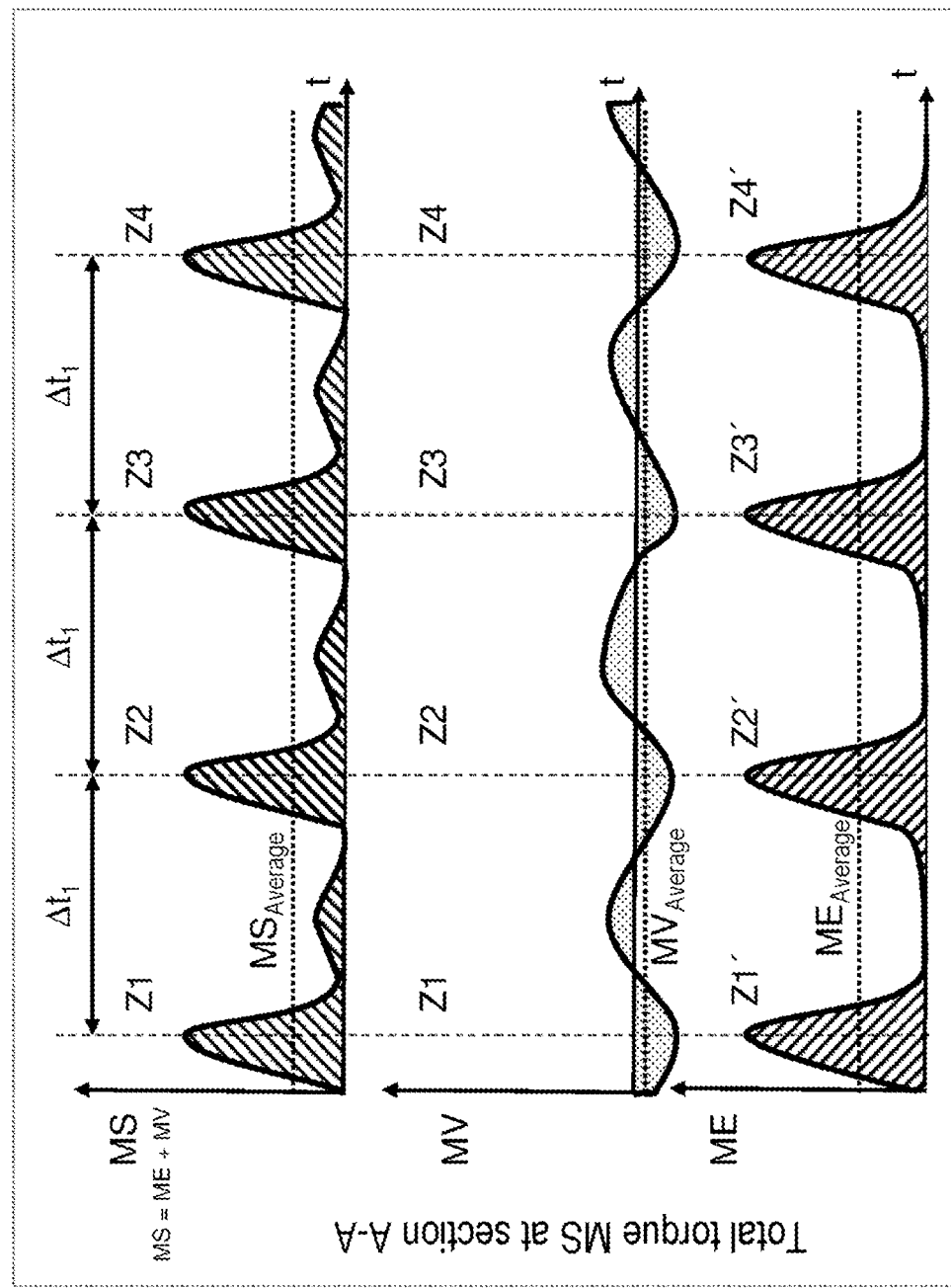
FIG. 2 shows an example of the actuation according to the present subject matter of the electric machine and FIG. 3 shows an example of the actuation according to the present subject matter of the electric machine.

The effect of the method according to the present subject matter according to an example is represented schematically or qualitatively by means of FIG. 2:

The electronic control unit 10 is designed in such a way that in purely electric motor mode the electric machine 5 at least almost identically, and/or to a large extent, substantially simulates the cylinder-ignition-dependent torque excitations Z1 to Z4 of the switched off combustion engine 3 as the electromotive torque excitation ME (Z1' to Z4') until the re-activation of the combustion engine 3. MS represents the summation signal of the two torque excitations MV and ME.

Figure 3:
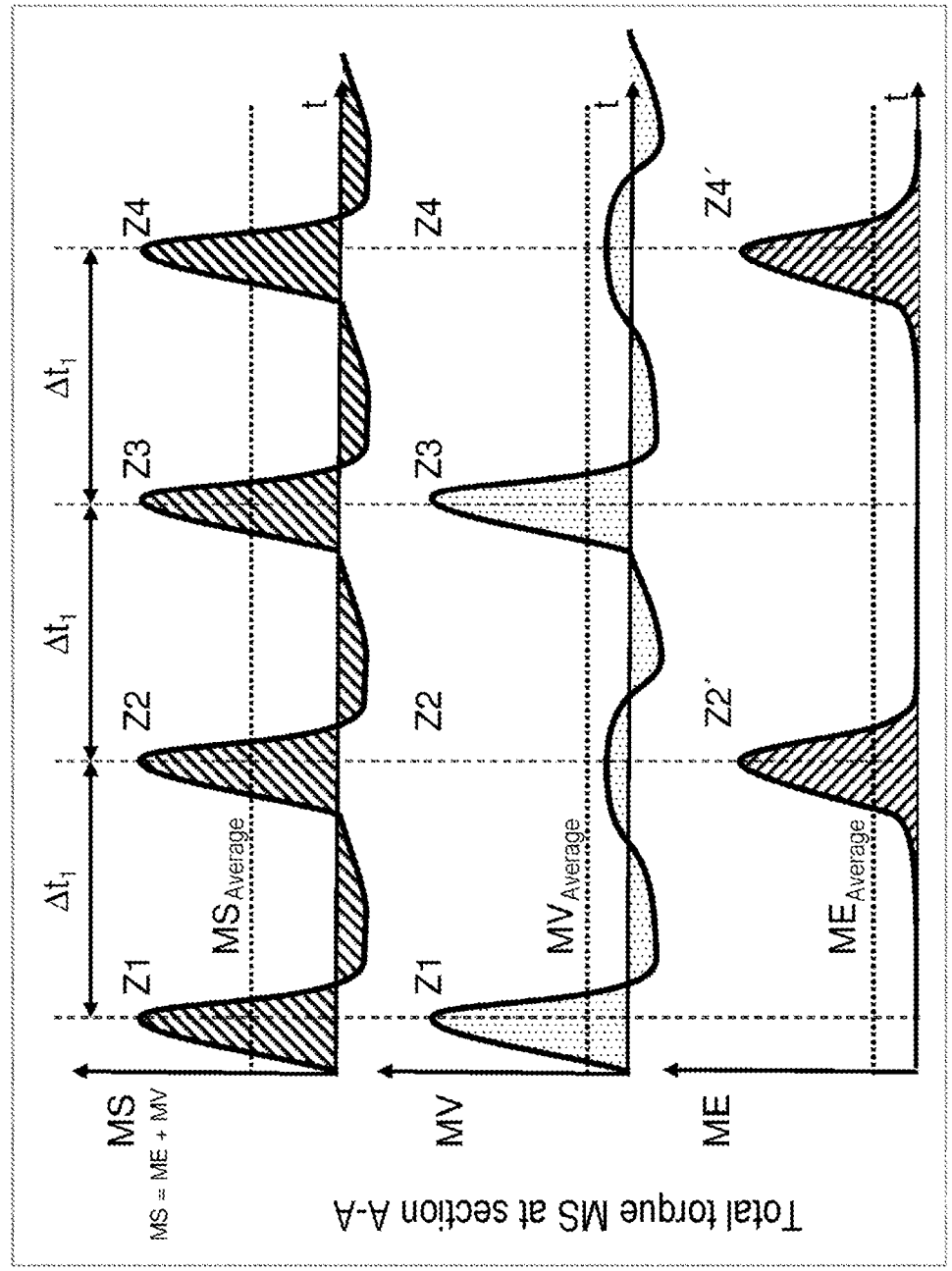

The effect of the method according to the present subject matter according to an example is represented by means of FIG. 3:

The electronic control unit 10 is designed in such a way that, with only some cylinders of the combustion engine 3 switched off (e.g., Z2 and Z4), the electric machine 5 at least almost identically simulates the missing cylinder-ignition-dependent torque excitations MV of the switched-off cylinders as electromotive torque excitations ME (e.g., Z2' and Z4') until all cylinders of the combustion engine 3 are reactivated.

Preferably, the combustion engine 3 is dragged by the electric machine 5 or remains coupled in partially or completely switched-off mode without combustion, wherein in particular the clutch 8 remains engaged in a P2 topology.

The torsional vibration damper 4, which is arranged between the combustion engine 3 and the electric machine 5, is preferably designed as a spring stage for vibration damping in the entire revolution rate range.

The torsional vibration stabilizer 9, which is arranged downstream of the electric machine 5, is preferably designed as a revolution rate-dependent centrifugal pendulum for vibration damping in the relatively low revolution rate range.

The present subject matter is not restricted to the example embodiments shown. It should be noted that the description and the figures are intended only to illustrate the principle of the proposed methods, devices and systems.

What is claimed is:

1. A control device for a hybrid drive comprising:
   a combustion engine comprising a plurality of cylinders;
   an electric motor configured to generate drive torque that provides propulsion for a vehicle;
   a torsional vibration stabilizer; and
   an electronic control unit;
   wherein:
   the torsional vibration stabilizer is configured to achieve vibration damping in a combustion engine mode with all of the plurality of cylinders of the combustion engine operating; and
   the electronic control unit is configured such that, in a completely switched-off mode of the combustion engine where all of the plurality of cylinders are switched off and the electric motor generates drive torque the provides propulsion to the vehicle, the electric motor substantially simulates the cylinder-ignition-dependent torque excitations of the combustion engine using electric motor generated torque excitations until re-activation of the combustion engine.

2. A control device for a hybrid drive comprising:
   a combustion engine comprising a plurality of cylinders;
   an electric motor configured to generate drive torque that provides propulsion for a vehicle;
   a torsional vibration stabilizer; and
   an electronic control unit;
   wherein:
   the torsional vibration stabilizer is configured to achieve vibration damping in a combustion engine mode with all of the plurality of cylinders of the combustion engine operating;
   the combustion engine is configured to implement full and partial cylinder operation modes in which one or more cylinders are switched-off; and
   the electronic control unit is configured such that, in the partial cylinder operation mode while the electric motor generates drive torque for the vehicle, the electric motor substantially replaces missing cylinder-ignition-dependent torque excitations of the switched off cylinders in the partial cylinder operation mode of the combustion engine using electric motor generated torque excitations until all cylinders of the combustion engine are reactivated.

3. The control device according to claim 1, wherein the combustion engine is configured to be dragged by the electric motor in the completely switched-off mode or a partially switched-off mode.

4. The control device according to claim 1, wherein:
   the combustion engine comprises valve control devices configured to deactivate the inlet and exhaust valve opening actuations; and
   the electronic control unit is configured to deactivate the inlet and exhaust valve opening actuations when the combustion engine is dragged by the electric motor when in the completely switched-off mode or a partially switched-off mode.

5. The control device according to claim 1, further comprising:

an additional torsional vibration damper arranged between the combustion engine and the electric motor.

6. The control device according to claim 1, wherein the torsional vibration stabilizer is arranged downstream of the electric motor.

7. The control device according to claim 1, wherein the torsional vibration damper is configured as a spring stage for vibration damping in an entire revolution rate range.

8. The control device according to claim 1, wherein the torsional vibration stabilizer is configured as a revolution rate-dependent centrifugal pendulum for vibration damping in a relatively low revolution rate range.

9. A method for operating a hybrid drive using an electronic control unit of a control device for the hybrid drive, comprising:
 a combustion engine comprising a plurality of cylinders;
 an electric motor configured to generate drive torque that provides propulsion for a vehicle;
 a torsional vibration stabilizer; and
 the electronic control unit;
 wherein:
  the torsional vibration stabilizer is configured to achieve vibration damping in a combustion engine mode with all of the plurality of cylinders of the combustion engine operating; and
  the electronic control unit is configured such that, in a completely switched-off mode of the combustion engine where all of the plurality of cylinders are switched off and the electric motor generates drive torque that provides propulsion for the vehicle, the electric motor substantially simulates the cylinder-ignition-dependent torque excitations of the combustion engine using electric motor generated torque excitations until re-activation of the combustion engine;
 wherein the method for operating the hybrid drive comprises:
  actuating the electric motor using the electronic control unit;
  in the completely switched off mode, substantially simulating the cylinder-ignition-dependent torque excitations using the electric motor until reactivation of the combustion engine; and
  in a partially switched-off mode where less than all cylinders of the plurality of cylinders are switched off, substantially simulating missing torque excitations of the switched-off cylinders of the combustion engine by using the electric motor to generate torque excitations unit the reactivation of all cylinders of the plurality of cylinders of the combustion engine.

10. The control device according to claim 1, wherein the hybrid drive is a P2 topology hybrid drive comprising a separating clutch that remains engaged between the combustion engine and the electric motor.

* * * * *